United States Patent
Gao et al.

(10) Patent No.: US 10,318,822 B2
(45) Date of Patent: Jun. 11, 2019

(54) OBJECT TRACKING

(71) Applicant: GM GLOBAL TECHNOLOGY OPERATIONS LLC, Detroit, MI (US)

(72) Inventors: Peter Gao, San Francisco, CA (US); Gautier Minster, San Francisco, CA (US); Elliot Branson, San Francisco, CA (US); Stuart Glaser, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 38 days.

(21) Appl. No.: 15/480,437

(22) Filed: Apr. 6, 2017

(65) Prior Publication Data

US 2018/0293445 A1    Oct. 11, 2018

(51) Int. Cl.
*G06K 9/00* (2006.01)
*B60W 10/04* (2006.01)
(Continued)

(52) U.S. Cl.
CPC ......... *G06K 9/00791* (2013.01); *B60W 10/04* (2013.01); *B60W 10/10* (2013.01); *B60W 10/18* (2013.01); *B60W 10/20* (2013.01); *B60W 30/09* (2013.01); *G05D 1/0248* (2013.01); *G06K 9/00805* (2013.01); *G06K 9/3233* (2013.01);
(Continued)

(58) Field of Classification Search
CPC .. G06K 9/00791; G06K 9/00805; G06K 9/52; G06K 9/00765; G06K 9/00771; G06K 9/00778; G06K 9/6202; G06K 2017/0045; G06T 2207/30261; G06T 7/20; G06T 7/215; G06T 7/292; B60W 10/04; B60W 10/10; B60W 10/18; B60W 10/20; B60W 10/30; B60W 30/08; B60W 30/09; B60W 30/095; B60W 30/0953; B60W 30/0956; B60W 2420/42; B60W 2550/10; B60W 2550/20; B60W 2550/402; G05D 1/0238; G05D 1/0248; G05D 1/0088; G05D 1/0214; G05D 1/0231; G05D 1/0246; G05D 1/0251; G05D 1/0257; G05D 2201/0213; G05D 2201/0209; G08G 1/16; G08G 1/005; G08G 1/166; G08G 1/167; B60R 21/01; B60Q 1/525; B60Q 5/005; B60Q 5/006; B60Q 9/008; H04N 5/247; H04N 5/144; H04N 5/145; H04N 5/147; H04N 13/243; H04N 7/188; H04N 2013/0085
See application file for complete search history.

(56) References Cited

U.S. PATENT DOCUMENTS 5,832,400 A * 11/1998 Takahashi .............. B60K 31/00
701/53
9,315,192 B1 * 4/2016 Zhu ........................ B60W 30/18
(Continued)

*Primary Examiner* — Jose L Couso
(74) *Attorney, Agent, or Firm* — Lorenz & Kopf LLP

(57) ABSTRACT

Methods and systems are provided for tracking an object. The system includes a data receiving module receiving two dimensional imaging data including an object and height map data correlating ground height and location. A two dimensions to three dimensions transformation module determines a location of the object in three dimensional space based on the two dimensional imaging data and the height map data. A tracking module tracks the object using the location of the object.

16 Claims, 6 Drawing Sheets

(51) Int. Cl.
*B60W 10/10* (2012.01)
*B60W 10/18* (2012.01)
*B60W 10/20* (2006.01)
*B60W 30/09* (2012.01)
*G05D 1/02* (2006.01)
*G06K 9/52* (2006.01)
*G08G 1/16* (2006.01)
*G06K 9/32* (2006.01)
*B60W 50/14* (2012.01)
*G01S 19/13* (2010.01)
*G05D 1/00* (2006.01)
*G06Q 50/30* (2012.01)
*G06T 15/20* (2011.01)
*G08G 1/127* (2006.01)
*G08G 1/00* (2006.01)

(52) U.S. Cl.
CPC ............... *G06K 9/52* (2013.01); *G08G 1/16* (2013.01); *B60W 2050/146* (2013.01); *B60W 2420/42* (2013.01); *B60W 2420/52* (2013.01); *B60W 2510/10* (2013.01); *B60W 2510/18* (2013.01); *B60W 2510/20* (2013.01); *B60W 2550/10* (2013.01); *B60W 2710/10* (2013.01); *B60W 2710/18* (2013.01); *B60W 2710/20* (2013.01); *G01S 19/13* (2013.01); *G05D 1/0027* (2013.01); *G05D 1/0297* (2013.01); *G06Q 50/30* (2013.01); *G06T 15/20* (2013.01); *G06T 2207/30252* (2013.01); *G08G 1/127* (2013.01); *G08G 1/202* (2013.01)

(56) References Cited

U.S. PATENT DOCUMENTS

| | | | |
|---|---|---|---|
| 10,032,276 B1* | 7/2018 | Liu | H04N 5/247 |
| 10,043,076 B1* | 8/2018 | Zhang | G06K 9/00671 |
| 10,078,335 B2* | 9/2018 | Mei | G05D 1/024 |
| 10,137,890 B2* | 11/2018 | Sakai | B60W 30/09 |
| 2016/0221503 A1* | 8/2016 | Krokel | G06T 5/006 |
| 2016/0307052 A1* | 10/2016 | Han | G06K 9/00798 |
| 2017/0066449 A1* | 3/2017 | Lee | B60G 17/019 |
| 2017/0124725 A1* | 5/2017 | Sumiyoshi | B60R 11/04 |
| 2017/0262734 A1* | 9/2017 | Nakata | G08G 1/166 |
| 2018/0101739 A1* | 4/2018 | Zhang | G06K 9/4671 |
| 2018/0284802 A1* | 10/2018 | Tsai | G05D 1/0246 |

* cited by examiner

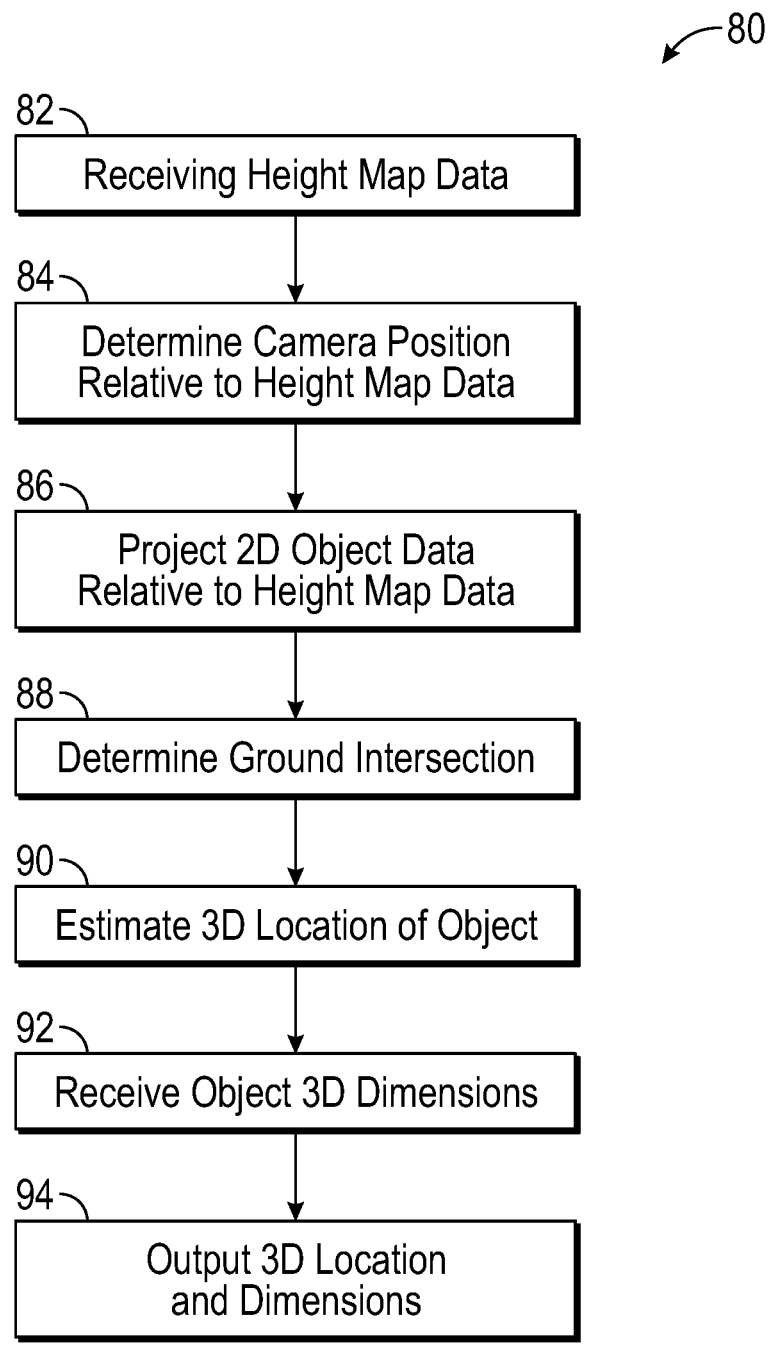

OBJECT TRACKING

INTRODUCTION

The present disclosure generally relates to autonomous vehicles, and more particularly relates to systems and methods for object tracking, and yet more particularly relates to object tracking in autonomous vehicle control.

BACKGROUND

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from a positioning system including global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

As part of control of an autonomous vehicle, objects are identified and tracked, for example to allow vehicle braking control, vehicle steering control and vehicle acceleration control based thereon.

Accordingly, it is desirable to accurately track objects. In addition, it is desirable to accurately identified number, size and dimensions of surrounding objects. Furthermore, other desirable features and characteristics of the present invention will become apparent from the subsequent detailed description of the invention and the appended claims, taken in conjunction with the accompanying drawings and the background of the invention.

SUMMARY

A system is provided for tracking an object. The system includes a data receiving module receiving two dimensional imaging data including an object and height map data correlating ground height and location. A two dimensions to three dimensions transformation module determines a location of the object in three dimensional space based on the two dimensional imaging data and the height map data. A tracking module tracks the object using the location of the object.

In embodiments, the two dimensions to three dimensions transformation module projects the object of the two dimensional imaging data into the height map data to determine a ground intersection for the object. Based on the ground intersection and the correlation of ground height and location in the height map data, the two dimensions to three dimensions transformation module determines the location of the object.

In embodiments, the two dimensional imaging data is received from a camera. The data receiving module receives a real world location of the camera. The two dimensions to three dimensions transformation module locates the camera in the height map data based on the real world location of the camera and projects the object of the two dimensional imaging data into the height map data from the camera location in the height map data in determining a location of the object in three dimensional space.

In embodiments, the two dimensional imaging data is received from a camera. The data receiving module receives calibration data including camera pose data. The two dimensions to three dimensions transformation module determines camera pose in the height map data and projects the object of the two dimensional imaging data into the height map data from the camera pose in the height map data in determining a location of the object in three dimensional space.

In embodiments, an object identification module demarcates the object to obtain two dimensional object data. The two dimensions to three dimensions transformation module determines the location of the object in three dimensional space based on the two dimensional imaging data, the height map data and the two dimensional object data.

In embodiments, the object identification module determines a bounding box as the two dimensional object data.

In embodiments, the two dimensions to three dimensions transformation module transforms a bottom of the bounding box to a ground intersection in the height map data in determining the location of the object in three dimensional space.

In embodiments, a visual classification module runs a neural network to classify the object and determines dimensions of the object based on the classification. The tracking module tracks the object using the location of the object and the dimensions of the object.

In embodiments, an object identification module demarcates the object to obtain a bounding box. The visual classification module performs bounding box regression on the bounding box using the neural network to obtain regressed bounding box. The two dimensions to three dimensions transformation module determines the location of the object in three dimensional space based on the two dimensional imaging data, the height map data and the regressed bounding box.

In embodiments, the tracking module tracks the object using the location of the object and responsively outputs tracking data. A vehicle control module exercises autonomous vehicle control based, in part, on the tracking data.

In embodiments, the data receiving module receives three dimensional imaging data including another object. The tracking module tracks the object based on the two dimensional imaging data and the other object based on the three dimensional imaging data.

An autonomous vehicle is provided. A sensor system includes a camera for obtaining two dimensional imaging data. A data receiving module receives two dimensional imaging data including an object and receives height map data correlating ground height and location. A two dimensions to three dimensions transformation module determines a location of the object in three dimensional space based on the two dimensional imaging data and the height map data. A tracking module tracks the object using the location of the object and responsively outputs tracking data. An autonomous vehicle control module exercises autonomous vehicle control based, in part, on the tracking data.

In embodiments, the sensor system includes a positioning system, including a Global Position System, GPS, receiver configured to provide GPS data, for estimating a location of the autonomous vehicle. The data receiving module receives calibration data including camera pose data spatially relating the autonomous vehicle and the camera. The two dimensions to three dimensions transformation module determines camera pose in the height map data based on the location of the autonomous vehicle and the camera pose data. The two dimensions to three dimensions transformation module ray traces the object of the two dimensional imaging data into the height map data from the camera pose in the height map data in determining a location of the object in three dimensional space.

In embodiments, the two dimensions to three dimensions transformation module transforms a height of the object in the two dimensional imaging data to a ground intersection in the height map data in determining location of the object in three dimensional space.

In embodiments, an object identification module demarcates the object to obtain a bounding box. A visual classification module configured performs bounding box regression on the bounding box using a neural network to obtain a regressed bounding box. The two dimensions to three dimensions transformation module determines the location of the object in three dimensional space based on the two dimensional imaging data, the height map data and the regressed bounding box.

In embodiments, the two dimensions to three dimensions transformation module transforms a bottom of the bounding box to a ground intersection in the height map data in determining the location of the object in three dimensional space.

A method of tracking an object is provided. The method includes receiving, via a processor, two dimensional imaging data including an object and receiving height map data correlating ground height and real world location. The method includes determining, via a processor, a real world location of the object in three dimensional space based on the two dimensional imaging data and the height map data. The method includes tracking, via a processor, the object using the location of the object.

In embodiments, the tracking step includes providing output tracking data, and the method includes exercising autonomous vehicle control based, in part, on the tracking data.

In embodiments, the method includes receiving a real world location of an autonomous vehicle including a camera for obtaining the two dimensional imaging data. The method includes receiving, via a processor, calibration data including camera pose data spatially relating the autonomous vehicle and the camera. The method includes determining, via a processor, a camera pose in the height map data based on the location of the vehicle and the camera pose data. The method includes ray tracing the object of the two dimensional imaging data into the height map data from the camera pose in the height map data in determining a location of the object in three dimensional space.

In embodiments, the method includes determining, via a processor, a ground intersection in the height map data based on the object in the two dimensional imaging data in determining location of the object in three dimensional space.

BRIEF DESCRIPTION OF THE DRAWINGS

The present invention will hereinafter be described in conjunction with the following drawing figures, wherein like numerals denote like elements.

FIG. 6 is a flowchart illustrating a two dimensions to three dimensions transformation process for an identified object, in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
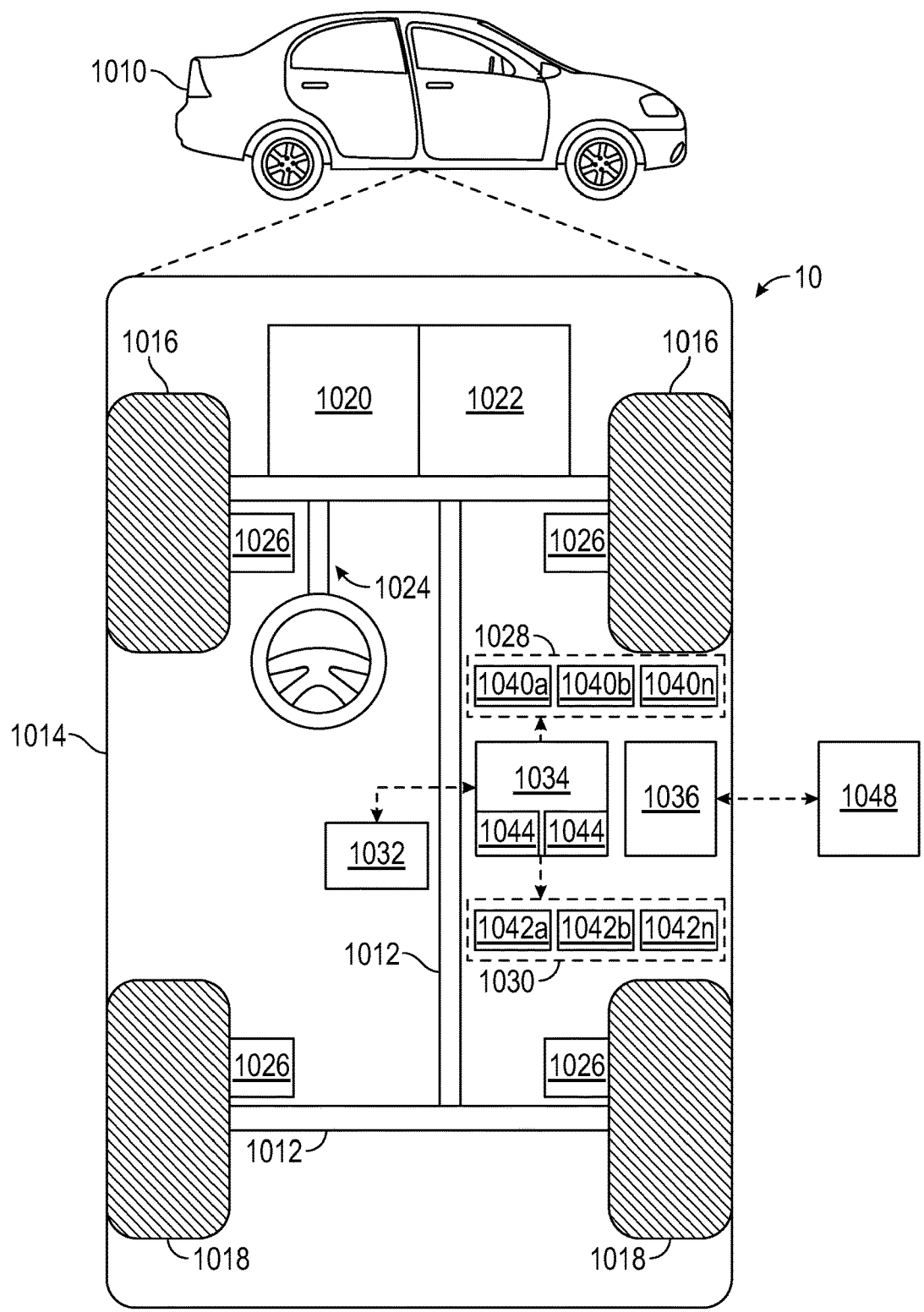
FIG. 1 is a functional block diagram illustrating an autonomous vehicle having an object tracking system, in accordance with various embodiments.

With reference to FIG. 1, an object tracking system shown generally at 10 is associated with a vehicle 1010 in accordance with various embodiments. In general, the object tracking system 10 identifies objects in three dimensional or two dimensional imaging data, refines size dimensions, position and/or number of objects based on two dimensional imaging data and outputs three dimensional data representing dimensions and location of objects. The object tracking system 10 intelligently controls the vehicle 1010 based thereon.

As depicted in FIG. 1, the vehicle 1010 generally includes a chassis 1012, a body 1014, front wheels 1016, and rear wheels 1018. The body 1014 is arranged on the chassis 1012 and substantially encloses components of the vehicle 1010. The body 1014 and the chassis 1012 may jointly form a frame. The wheels 1016-1018 are each rotationally coupled to the chassis 1012 near a respective corner of the body 1014.

In various embodiments, the vehicle 1010 is an autonomous vehicle and the object tracking system 10 is incorporated into the autonomous vehicle 1010 (hereinafter referred to as the autonomous vehicle 1010). The autonomous vehicle 1010 is, for example, a vehicle that is automatically controlled to carry passengers from one location to another. The vehicle 1010 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 1010 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 1010 generally includes a propulsion system 1020, a transmission system 1022, a steering system 1024, a brake system 1026, a sensor system 1028, an actuator system 1030, at least one data storage device 1032, at least one controller 1034, and a communication system 1036. The propulsion system 1020 may, in various embodiments, include an internal combustion engine, an electric machine such as a traction motor, and/or a fuel cell propulsion system. The transmission system 1022 is configured to transmit power from the propulsion system 1020 to the vehicle wheels 1016-1018 according to selectable speed ratios. According to various embodiments, the transmission system 1022 may include a step-ratio automatic transmission, a continuously-variable transmission, or other appropriate transmission. The brake system 1026 is configured to provide braking torque to the vehicle wheels 1016-1018. The brake system 1026 may, in various embodiments, include friction brakes, brake by wire, a regenerative braking system such as an electric machine, and/or other appropriate braking systems. The steering system 1024 influences a position of the of the vehicle wheels 1016-1018. While depicted as including a steering wheel for illustrative purposes, in some embodiments contemplated within the scope of the present disclosure, the steering system 1024 may not include a steering wheel.

The sensor system 1028 includes one or more sensing devices 1040a-40n that sense observable conditions of the exterior environment and/or the interior environment of the autonomous vehicle 10. The sensing devices 1040a-40n can include, but are not limited to, radars, lidars, global positioning systems, optical cameras, thermal cameras, ultrasonic sensors, and/or other sensors. The actuator system 1030 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
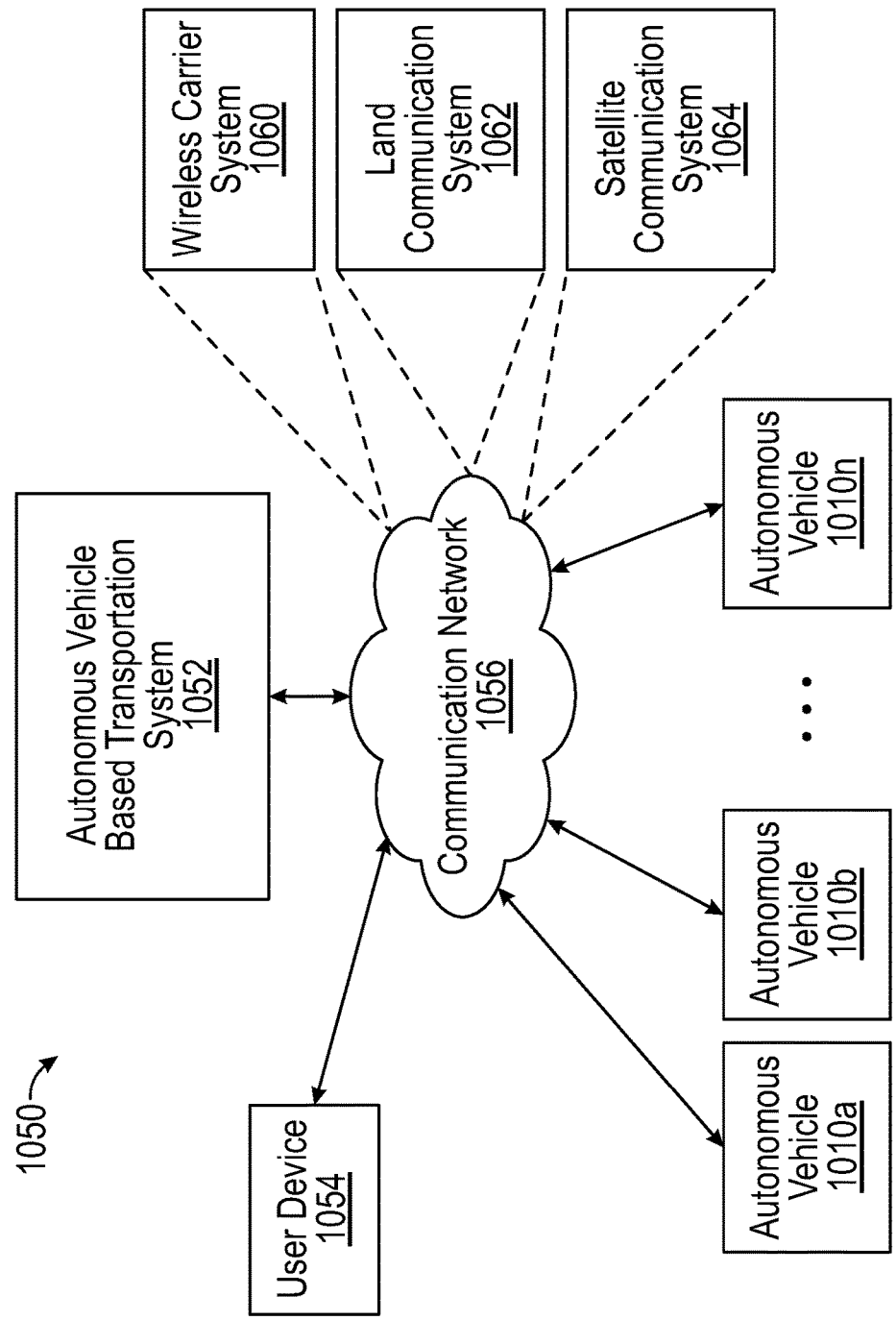
FIG. 2 is a functional block diagram illustrating a transportation system having one or more autonomous vehicles of FIG. 1, in accordance with various embodiments.

The communication system 1036 is configured to wirelessly communicate information to and from other entities 1048, such as but not limited to, other vehicles ("V2V" communication,) infrastructure ("V2I" communication), remote systems, and/or personal devices (described in more detail with regard to FIG. 2). In an exemplary embodiment, the communication system 1036 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 1032 stores data for use in automatically controlling the autonomous vehicle 1010. In various embodiments, the data storage device 1032 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 1010 (wirelessly and/or in a wired manner) and stored in the data storage device 32. As can be appreciated, the data storage device 1032 may be part of the controller 1034, separate from the controller 1034, or part of the controller 1034 and part of a separate system.

The controller 1034 includes at least one processor 1044 and a computer readable storage device or media 1046. The processor 1044 can be any custom made or commercially available processor, a central processing unit (CPU), a graphics processing unit (GPU), an auxiliary processor among several processors associated with the controller 1034, a semiconductor based microprocessor (in the form of a microchip or chip set), a macroprocessor, any combination thereof, or generally any device for executing instructions. The computer readable storage device or media 1046 may include volatile and nonvolatile storage in read-only memory (ROM), random-access memory (RAM), and keep-alive memory (KAM), for example. KAM is a persistent or non-volatile memory that may be used to store various operating variables while the processor 1044 is powered down. The computer-readable storage device or media 1046 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 1034 in controlling the autonomous vehicle 1010.

The instructions may include one or more separate programs, each of which comprises an ordered listing of executable instructions for implementing logical functions. The instructions, when executed by the processor 1034, receive and process signals from the sensor system 1028, perform logic, calculations, methods and/or algorithms for automatically controlling the components of the autonomous vehicle

1010, and generate control signals to the actuator system 1030 to automatically control the components of the autonomous vehicle 1010 based on the logic, calculations, methods, and/or algorithms. Although only one controller 1034 is shown in FIG. 1, embodiments of the autonomous vehicle 1010 can include any number of controllers 1034 that communicate over any suitable communication medium or a combination of communication mediums and that cooperate to process the sensor signals, perform logic, calculations, methods, and/or algorithms, and generate control signals to automatically control features of the autonomous vehicle 1010.

Figure 4:
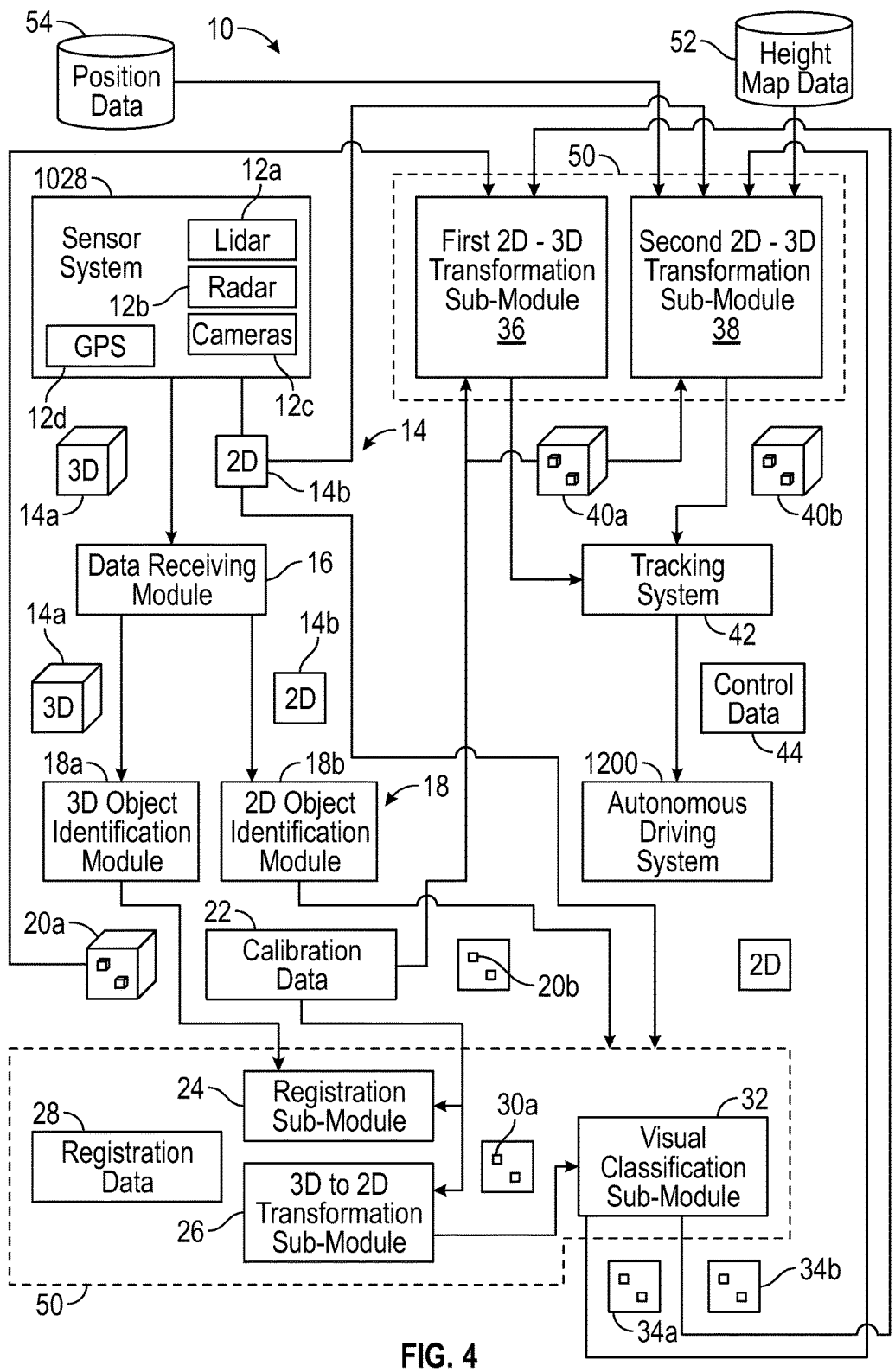
FIG. 4 is a diagram of modules and other entities and the data flow therebetween of an object tracking system of the autonomous vehicle, in accordance with various embodiments.
Figure 5:
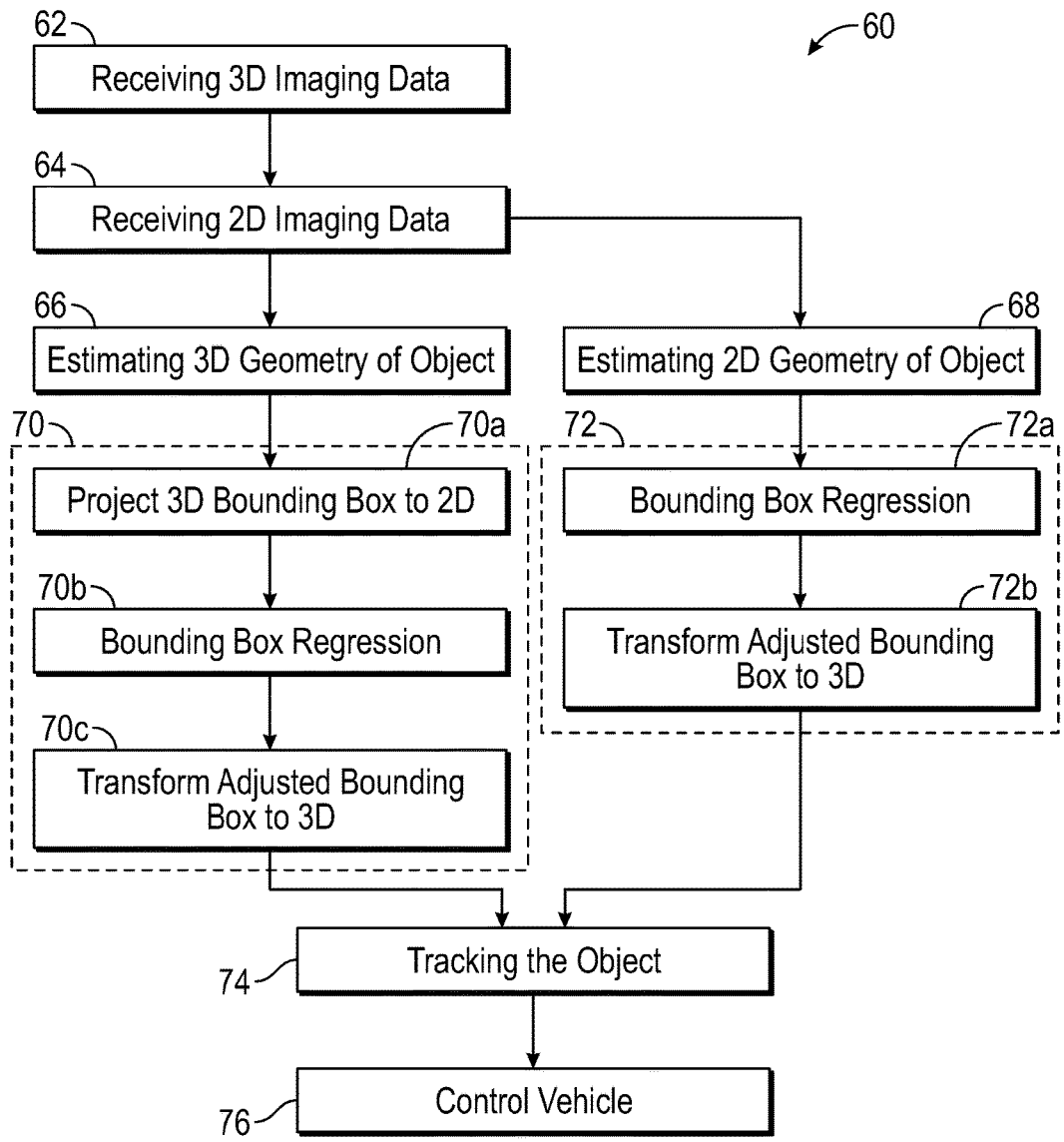
FIG. 5 is a flowchart illustrating a control method for controlling the autonomous vehicle based on object tracking, in accordance with various embodiments.

In various embodiments, one or more instructions of the controller 1034 are embodied in the object tracking system 10 and, when executed by the processor 44, implement modules as described with respect to FIG. 4 and method steps as described with respect to FIGS. 5 and 6 for tracking objects.

With reference now to FIG. 2, in various embodiments, the autonomous vehicle 1010 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 1010 may be associated with an autonomous vehicle based remote transportation system. FIG. 2 illustrates an exemplary embodiment of an operating environment shown generally at 1050 that includes an autonomous vehicle based remote transportation system 1052 that is associated with one or more autonomous vehicles 10*a*-10*n* as described with regard to FIG. 1. In various embodiments, the operating environment 1050 further includes one or more user devices 1054 that communicate with the autonomous vehicle 1010 and/or the remote transportation system 1052 via a communication network 1056.

The communication network 1056 supports communication as needed between devices, systems, and components supported by the operating environment 1050 (e.g., via tangible communication links and/or wireless communication links). For example, the communication network 1056 can include a wireless carrier system 1060 such as a cellular telephone system that includes a plurality of cell towers (not shown), one or more mobile switching centers (MSCs) (not shown), as well as any other networking components required to connect the wireless carrier system 1060 with a land communications system. Each cell tower includes sending and receiving antennas and a base station, with the base stations from different cell towers being connected to the MSC either directly or via intermediary equipment such as a base station controller. The wireless carrier system 1060 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 1060, a second wireless carrier system in the form of a satellite communication system 1064 can be included to provide uni-directional or bi-directional communication with the autonomous vehicles 1010*a*-1010*n*. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 1010 and the station. The satellite telephony can be utilized either in addition to or in lieu of the wireless carrier system 1060.

A land communication system 1062 may further be included that is a conventional land-based telecommunications network connected to one or more landline telephones and connects the wireless carrier system 1060 to the remote transportation system 1052. For example, the land communication system 1062 may include a public switched telephone network (PSTN) such as that used to provide hardwired telephony, packet-switched data communications, and the Internet infrastructure. One or more segments of the land communication system 1062 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 1052 need not be connected via the land communication system 1062, but can include wireless telephony equipment so that it can communicate directly with a wireless network, such as the wireless carrier system 1060.

Although only one user device 1054 is shown in FIG. 2, embodiments of the operating environment 1050 can support any number of user devices 1054, including multiple user devices 1054 owned, operated, or otherwise used by one person. Each user device 1054 supported by the operating environment 1050 may be implemented using any suitable hardware platform. In this regard, the user device 1054 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 1054 supported by the operating environment 1050 is realized as a computer-implemented or computer-based device having the hardware, software, firmware, and/or processing logic needed to carry out the various techniques and methodologies described herein. For example, the user device 1054 includes a microprocessor in the form of a programmable device that includes one or more instructions stored in an internal memory structure and applied to receive binary input to create binary output. In some embodiments, the user device 1054 includes a GPS module capable of receiving GPS satellite signals and generating GPS coordinates based on those signals. In other embodiments, the user device 1054 includes cellular communications functionality such that the device carries out voice and/or data communications over the communication network 1056 using one or more cellular communications protocols, as are discussed herein. In various embodiments, the user device 1054 includes a visual display, such as a touch-screen graphical display, or other display.

The remote transportation system 1052 includes one or more backend server systems, which may be cloud-based, network-based, or resident at the particular campus or geographical location serviced by the remote transportation system 1052. The remote transportation system 1052 can be manned by a live advisor, or an automated advisor, or a combination of both. The remote transportation system 1052 can communicate with the user devices 1054 and the autonomous vehicles 1010a-1010n to schedule rides, dispatch autonomous vehicles 1010a-1010n, and the like. In various embodiments, the remote transportation system 1052 stores account information such as subscriber authentication information, vehicle identifiers, profile records, behavioral patterns, and other pertinent subscriber information.

In accordance with a typical use case workflow, a registered user of the remote transportation system 1052 can create a ride request via the user device 1054. The ride request will typically indicate the passenger's desired pickup location (or current GPS location), the desired destination location (which may identify a predefined vehicle stop and/or a user-specified passenger destination), and a pickup time. The remote transportation system 1052 receives the ride request, processes the request, and dispatches a selected one of the autonomous vehicles 10a-10n (when and if one is available) to pick up the passenger at the designated pickup location and at the appropriate time. The remote transportation system 1052 can also generate and send a suitably configured confirmation message or notification to the user device 1054, to let the passenger know that a vehicle is on the way.

As can be appreciated, the subject matter disclosed herein provides certain enhanced features and functionality to what may be considered as a standard or baseline autonomous vehicle 1010 and/or an autonomous vehicle based remote transportation system 1052. To this end, an autonomous vehicle and autonomous vehicle based remote transportation system can be modified, enhanced, or otherwise supplemented to provide the additional features described in more detail below.

Figure 3:
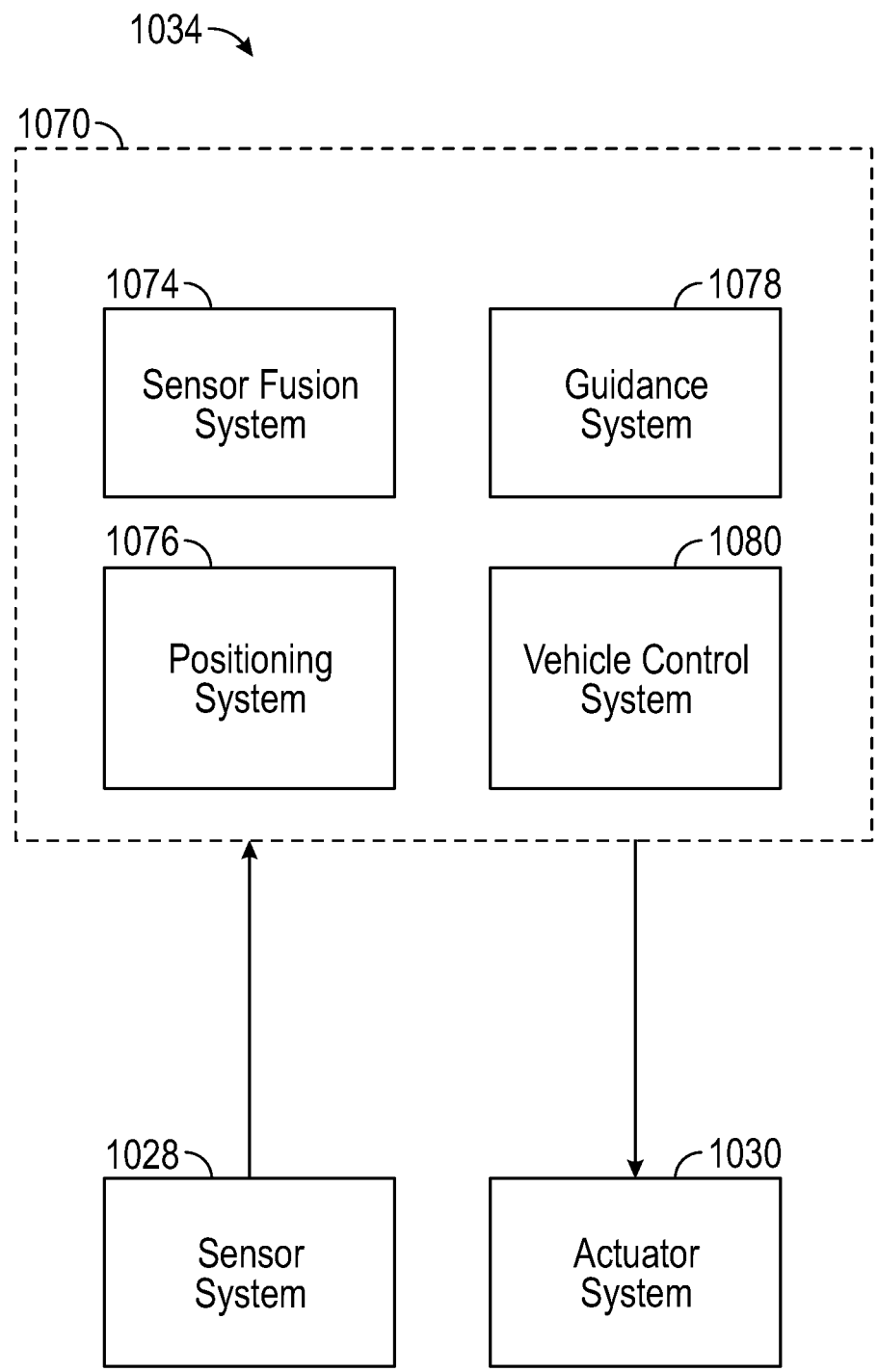
FIG. 3 is a dataflow diagrams illustrating an autonomous driving system that includes the object tracking system of the autonomous vehicle, in accordance with various embodiments.

In accordance with various embodiments, controller 1034 implements an autonomous driving system (ADS) 1070 as shown in FIG. 3. That is, suitable software and/or hardware components of controller 1034 (e.g., processor 1044 and computer-readable storage device 1046) are utilized to provide an autonomous driving system 1070 that is used in conjunction with vehicle 1010.

In various embodiments, the instructions of the autonomous driving system 1070 may be organized by function or system. For example, as shown in FIG. 3, the autonomous driving system 1070 can include a sensor fusion system 1074, a positioning system 1076, a guidance system 1078, and a vehicle control system 1080. As can be appreciated, in various embodiments, the instructions may be organized into any number of systems (e.g., combined, further partitioned, etc.) as the disclosure is not limited to the present examples.

In various embodiments, the sensor fusion system 1074 synthesizes and processes sensor data and predicts the presence, location, classification, and/or path of objects and features of the environment of the vehicle 1010. In various embodiments, the sensor fusion system 1074 can incorporate information from multiple sensors, including but not limited to cameras, lidars, radars, and/or any number of other types of sensors.

The positioning system 1076 processes sensor data along with other data to determine a position (e.g., a local position relative to a map, an exact position relative to lane of a road, vehicle heading, velocity, etc.) of the vehicle 1010 relative to the environment. The guidance system 1078 processes sensor data along with other data to determine a path for the vehicle 1010 to follow. The vehicle control system 1080 generates control signals for controlling the vehicle 1010 according to the determined path.

In various embodiments, the controller 1034 implements machine learning techniques to assist the functionality of the controller 1034, such as feature detection/classification, obstruction mitigation, route traversal, mapping, sensor integration, ground-truth determination, and the like.

The vehicle control system 1080 is configured to communicate a vehicle control output to the actuator system 1030. In an exemplary embodiment, the actuators 1042 include a steering control, a shifter control, a throttle control, and a brake control. The steering control may, for example, control a steering system 1024 as illustrated in FIG. 1. The shifter control may, for example, control a transmission system 1022 as illustrated in FIG. 1. The throttle control may, for example, control a propulsion system 1020 as illustrated in FIG. 1. The brake control may, for example, control wheel brake system 1026 as illustrated in FIG. 1.

As mentioned briefly above, the object tracking system 10 of FIGS. 1 and 4 is included within the autonomous driving system 1070, for example, as part of the positioning system 1076. The object tracking system 10 of various embodiments of the present disclosure allows two dimensional imaging data, e.g. camera data, to be used to enhance object detection from three dimensional imaging data, e.g. lidar data. Through the object tracking system 10, objects can be identified, located and have dimensions determined as part of the positioning system 1076. Control data may be determined at least partly through the object tracking system 10 which partly contributes to the vehicle control output from the vehicle control system.

For example, as shown in more detail with regard to FIG. 4 and with continued reference to FIG. 3, the object tracking system 10 includes a plurality of modules and other system parts for tracking the position and dimensions of an object based on three-dimensional and two-dimensional imaging data.

In exemplary embodiments, the object tracking system 10 receives sensor data through sensor devices of the sensor system 1028 including at least Radar, Lidar and Camera data capture devices 12a, 12b, 12c. The Lidar data capture device 12a can be considered a three-dimensional imaging device as it captures data concerning distance from the Lidar data capture device 12a to a reflecting object in for a large population of data points in a plane orthogonal to the distance direction away from the device 12a. Although Lidar data capture device 12a is exemplified herein for obtaining the three dimensional imaging data, other range finding scanners could be utilized such as Radar. The Lidar device 12a may be mounted to a vehicle such as on the roof. The cameras 12c usually comprises multiple cameras 12c distributed around the vehicle. The cameras 12c may be sufficiently distributed to allow 360° surround view.

In exemplary embodiments, the lidar data capture device 12a includes pairs of laser emission devices and laser sensing devices for measuring distances by measuring the Time of Flight (TOF) that it takes a laser pulse to travel from the emission device to an object and back to the sensing device, calculating the distance from the known speed of light. The Lidar capture device 12a may combine multiple laser/detector pairs (up to 64, for example) into one sensor and may pulse in the kilohertz range to allow for measurements of millions of data points per second. Vertical fields of view of, for example, 30° to 40° are covered, with full 360° horizontal field of view enabled by rotating the laser/detector pairs such as at rotational speeds of up to 20 times per second. In addition to each distance measurement, the Lidar capture device 12a is also configured to measure calibrated reflectivities that allow for easy detection of retro-reflectors like street-signs, license-plates and lane-markings.

The cameras 12c are configured to measure light reflected from an object into the camera 12c. Images are typically in color and display a visual image of the surrounding. Unlike Lidar data capture device 12a and other range measuring scanners, camera images do not measure distance in three dimensions. Images from cameras 12c may be formed from individual frames of video data. Images from cameras 12c are two dimensional.

It has been found that Lidar imaging can clip, merge, divide or miss objects. This can happen with nonreflective or low reflective objects (such as black cars) or when the beams are fired at objects with a shallow angle of incidence. Also, Lidar beams may diverge and be sufficiently spread apart at a certain threshold distance away from the Lidar device 12a that objects can be missed. However, camera image data does not share these issues. Camera images are denser, so can see farther away. Further, camera images do not rely on reflected laser beams, so have less problems with low reflectivity objects. By contrast, camera images are less effective for deriving distance data. Accordingly, the present disclosure provides systems and methods that combine the use of three-dimensional imaging data, such as from Lidar and Radar devices 12a, 12b, and two-dimensional imaging data, such as from cameras 12c. In particular, Lidar images are used to provide a first estimate of position and dimension of objects of interest in a two dimensional camera image, and the two dimensional camera image is used to refine our estimation of the object's geometry (e.g. position and dimensions). The present disclosure additionally or alternatively allows objects that have been wholly or partially missed in three dimensional imaging data 14a to be tracked by deriving three dimensional position data (object pose) of the object from the two dimensional imaging data 14b.

In exemplary embodiments, the object tracking system 10 includes a data receiving module 16 configured to receive imaging data 14 from the sensor system 1028, optionally via the sensor fusion system 1076. As such, the data receiving module 16 comprises an input data interface and an output data interface as well as a processor executing instructions to direct the imaging data 14 to other modules as required. The processor may be the at least one processor 1044 described above. In particular, the data receiving module 16 is configured to receive three dimensional imaging data 14a and two dimensional imaging data 14b from the sensor system 1028. The imaging data 14 may cover a vertical plane extending around the vehicle in two and three dimensions. Successive frames of such imaging data 14 are receivable by the data receiving module 16.

In exemplary embodiments, the object tracking system 10 includes object identification modules 18 configured to identify and demarcate objects in the imaging data 14. In particular, the object tracking system 10 includes a three-dimensional object identification module 18a and a two-dimensional object identification module 18b configured to respectively operate on three-dimensional imaging data 18a and the two-dimensional imaging data 18b. The object identification modules 18 operate object identification analyses, which analyses may include at least one of back-ground removal and segmentation image processing. The analyses may include at least one image filtering operation. Image processing for identifying objects is available to the skilled person in the art. The object identification modules 14 are further configured to determine a bounding box for each identified object in the imaging data. The image processing to identify objects and for establishing bounding boxes 20a, 20b for the identified objects is carried out by a processor operating image processing instructions.

In exemplary embodiments, the object identification module 18a that operates on three-dimensional imaging data 14a, e.g. Lidar data, is configured to establish three-dimensional bounding boxes 20a for identified objects. The bounding boxes 20a may be constituted by a data structure including three-dimensional position coordinates in the real world (as opposed to image space), e.g. x, y and z coordinates (x being horizontal position, y being vertical position and z being distance away from vehicle or Lidar device 12a) relative to the vehicle or the Lidar device 12a, as well as three-dimensional dimensions for the bounding box such as length, width and height. The position data for the bounding boxes 20a may locate a center of the bounding box 20a. The bounding boxes 20b derived from the two-dimensional imaging data 14b may be constituted by a data structure identifying location and dimensions of the of the bounding boxes 20b. For example, the bounding boxes 20b can be identified by center point location in x and y coordinates (x being horizontal position, y being vertical position) relative to real space and height and width dimensions.

In exemplary embodiments, the object tracking system 10 includes a registration sub-module 24, a 3 dimension to 2 dimensions (3D to 2D) transformation module 26, a visual classification sub-module 32 and first and second 2D to 3D sub-modules 36, 38 as part of an adjustment module 50. The adjustment module 50 is configured to receive the bounding boxes 20a, 20b in both three dimensional and two-dimensional form as region proposals, and to adjust the position and/or dimensions of the regional proposals, in the form of first bounding boxes 20a, 20b, based on the two-dimensional imaging data 14b obtained from the cameras 12c. In particular, the adjustment module 50 is configured to receive the bounding boxes 20a, 20b, to run a neural network processing engine using the two-dimensional imaging data 14b in order to carry out bounding box regression, to thereby more accurately represent the size and dimension of the bounding boxes 20a, 20b to the size and position of the object in the two-dimensional imaging data 14b. The object tracking system 10 includes a neural network engine that has been trained for the objects of interest to vehicles, in one embodiment, that includes trained data, trained processes in the form of computer program instructions and a processor for executing those instructions. Such objects of interest that form part of the training of the neural network engine include pedestrians, street signs, vehicles, buildings, street lighting, etc. Further, the computer program instructions are operable to perform the bounding box regression process.

For three-dimensional bounding boxes 20a, the adjustment module 50 is configured to adjust a demarcated three-dimensional object 20a based on the two-dimensional imaging data 14b and to output an adjusted three-dimensional object 40a. The demarcated three-dimensional object 30a and the adjusted two-dimensional object are represented by object data 20a, 30a operated upon by the adjustment module 50, specifically as bounding box data in embodiments. In embodiments, the adjustment module 50 is configured to carry out a projection process that transforms the three-dimensional bounding boxes 20a into two-dimensional bounding boxes 30a, to thereafter carry out bounding box regression through a neural network to obtain an adjusted two-dimensional bounding box 30a based on the two dimensional imaging data 14b and then to perform a reverse projection process to convert the adjusted two-dimensional bounding box into an adjusted three-dimensional bounding box 40a.

It can occur that the captured three-dimensional data 14a, e.g. from the Lidar device 12a, has partial information on an object. For example, the 3D object identification module 18a may incorrectly determine an object is two objects, by returning two bounding boxes 20a, when in reality there is only one object. This could happen due to black cars when, as one possible instance, the Lidar device 12a receives no reflections from the middle of the car, only the sides, so the Lidar data 14a indicates the car as being split into two. By performing adjustment of the demarcated object data 20a, through the adjustment module 50, based on two-dimensional imaging data 14b, corrected object data 34a, 40a can be determined in which the separate object data 20a or bounding boxes 20a are re-formed into a combined object in the adjusted object data 34a, 40a. In another scenario, Lidar data and the subsequent object identification process through object identification module 18a may resolve plural objects as a single object. For example, a segmentation process run by the object identification module 18a may group plural people into a single object. The adjustment module 50 is able to detect that there are, in fact, plural distinct people based on the two-dimensional imaging data 14b and to consequently output corrected object data 34a. Accordingly, in embodiments, the adjustment module 50 is able to adjust dimensions, position and number of objects determined by the object identification module 18a by refining object data 20a obtained from the adjustment module 50 based on two-dimensional imaging data 14b.

It can also occur that the Lidar data 14a misses an object. Such can happen at long ranges due to Lidar beam divergence or when an object is practically nonreflective to the Lidar beams. In this situation, two-dimensional imaging data 14b from the camera 12c. For this reason, the present disclosure proposes to run object identification, bounding box regression and 2D to 3D transformation processes based purely on the two-dimensional imaging data 14b. In this way, in some embodiments, object data 20a originating from the three-dimensional imaging data 14a can be refined using the two-dimensional imaging data 14b. In additional or alternative embodiments, three-dimensional object data 40b for use in object tracking can be derived directly from the two-dimensional imaging data 14b, which can be especially useful where the Lidar data is not available or misses an object. The manner by which the two-dimensional imaging data 14b is made into three-dimensional object data useful for object tracking is described herein with reference to the 2D object identification module, the visual classification sub-module and the second 2D to 3D transformation sub-module 38.

In the exemplary embodiment of FIG. 4, the adjustment module 50 has been divided into a number of sub-modules for ease of explanation. There is a registration sub-module 24 in communication with calibration data 22 that is configured to determine a position of the bounding boxes in two-dimensional space of the imaging data 14b. The calibration data 22 may be stored in the data storage device 1032. The registration sub-module 24 outputs registration data corresponding to registration or spatial correlation of the three-dimensional images and the two-dimensional images, thereby allowing correct position of a projection of the three-dimensional imaging data 20a in two-dimensional image space. The registration sub-module 24 makes use of intrinsic and extrinsic calibration data 22, which is described further below, to perform 3D to 2D image registration.

The calibration data 22 includes extrinsic and intrinsic calibration data. The extrinsic calibration data describes the pose of the camera 12c relative to the pose of the Lidar device 12a or the vehicle 1010. The extrinsic calibration data has been determined through an extrinsic calibration process that calibrates each camera 12c to the Lidar 12a. The extrinsic calibration process allows spatial correspondence to be determined between points in the Lidar imaging data 14a to points in the camera images 14b and also allows time synchronization between the Lidar imaging data 14a and the camera imaging data 14b. The intrinsic calibration data accounts for distortion of the camera and other intrinsic image correction processes.

The 3D to 2D transformation sub-module 26 is configured to project dimensions of the three-dimensional bounding boxes 20a into two-dimensional image space using the intrinsic and extrinsic calibration data 22. Accordingly, the registration sub-module and the 3D to 2D transformation sub-module 26 operate together to project position and dimensions of the three-dimensional bounding boxes 20a into position and dimensions of two-dimensional bounding boxes 30a using the extrinsic and intrinsic calibration data 22. The registration sub-module 24 and the 3D to 2D transformation module 26 include a processor and computer readable instructions configured to carry out the required registration and transformation processes. The registration sub-module and the 3D to 2D transformation module 26 are configured to output a two-dimensional bounding box 30a as a region proposal for subsequent bounding box regression processes described above. It will be appreciated that the 3D to 2D transformation sub-module 26 and the registration sub-module 24 have been described herein as separate modules, but a single module may be provided to carry out registration and projection process in an integrated module.

In the exemplary embodiment of FIG. 4, a visual classification sub-module 32 is included, which is configured to receive the two-dimensional bounding boxes 20b from the two-dimensional object identification module 18b and the bounding boxes 30a from the registration and 3D to 2D transformation sub-modules 24, 26. The two-dimensional bounding boxes 20a have been derived from object identification and demarcation processes carried out on two dimensional imaging data 14b and so can be termed '2D image originating bounding boxes'. By contrast, the two-dimensional bounding boxes 30a have been derived from three-dimensional imaging data 14a and projected into two dimensional image space and so can be termed '3D image originating bounding boxes'. The visual classification sub-module 32 is configured to run a neural network on the region proposals constituted respectively by the 2D and 3D imaging originating bounding boxes 20b, 30a to obtain a classification and a bounding box regression. The classification is useful for other processes but is not directly relevant to the present disclosure. The bounding box regression process aims to utilize the neural network to obtain truer dimensions of an object based on input two-dimensional imaging data 14b as compared to the rougher estimates provided by the regional proposals. As such, the bounding box regression executed by the visual classification sub-module 32, specifically the neural network engine described above, is able to better fit the bounding boxes 20b, 30a to the corresponding objects. In this way, adjusted bounded boxes 34a, 34b, which correspond to adjusted demarcated objects, are output from the adjustment module 50, specifically the visual classification sub-module 32 thereof.

The bounding box regression performed by the visual classification sub-module is configured to receive two dimensional imaging data 14*b* and bounding boxes 30*a*, 30*b* within the two dimensional imaging data 14*b*. The bounding box regression runs a neural network on the bounding boxes 30*a*, 30*b* within the two dimensional imaging data 14*b*. The neural network outputs classifications and refined bounding boxes that more tightly fit the geometry of the object being classified. For example, taking a Lidar image of a bumper of a distant car, as an exemplary object, the object tracking system 10, through the registration sub-module 24 and the 3D to 2D transformation sub-module 26, is able to determine location and dimensions of the bumper as a region proposal 30*a*. However, the region proposal 30*a* is actually smaller in one or more dimensions than the actual bumper, possibly because of Lidar angle of incidence, poor reflectivity, etc. By providing the comparatively rough region proposal 30*a* to the visual classification sub-module 32, the neural network analyses the two-dimensional image data 14*b* and is able to determine upon truer dimensions of the bumper in the image, which are, for example, wider and taller. The visual classification sub-module 32 is configured to output adjusted bounding boxes 34*a* having adjusted dimensions. Not only can object dimensions be more truly determined based on the two dimensional imaging data 14*b*, but incorrectly divided objects, determined based on three dimensional imaging data 14*a*, can be corrected. In the case of two objects that really should be one, the bounding box regression of one or both of the objects represented by 3D image originating bounding boxes 30*a* can regress to the actual geometry of the object, thereby merging the plural bounding boxes 30*a* into one or more adjusted bounding boxes 34*a*.

In cases where bounding boxes 30*a* based on the three dimensional imaging data 14*a* merges plural objects, the bounding box regression is able to split the bounding boxes to determine plural regressed bounding boxes 34 from a single 3D image originating bounding box 30*a*.

In cases where objects are partially or wholly missed by the three dimensional imaging data 14*a*, the 2D image originating bounding boxes 20*a* can be used to fill in the missing object data. The bounding box regression 20*a* can still be run on the bounding boxes 20*a* as regional proposal to obtain truer dimensions therefor to determine adjusted two dimensional bounding boxes 34*b*.

In embodiments, the output of the bounding box regression performed by the visual classification sub-module 32 represents truer dimension in two-dimensional image space. However, in embodiments, the tracking system 42 is configured to perform object tracking in real three-dimensional space. Accordingly, a first 2D to 3D transformation sub-module 36 is configured to transform the adjusted two-dimensional bounding boxes 34*a* originating from the three-dimensional imaging data 14*a* to three-dimensional bounding boxes 40*a*. The first 2D to 3D transformation sub-module 36 is configured to take as an input distance data of the object from the Lidar device 12*a*, which can be ascertained from the three-dimensional bounding box data 20*a* (the z coordinate thereof). Further, intrinsic and extrinsic calibration data 22 of the camera 12*c* can be used as a further input. From the distance data and the calibration data, a reverse projection transformation can be performed. That is, the transformation performed by the registration and 3D to 2D sub-modules 24, 26, whereby object tracking data 20*a* in three-dimensions is converted to coordinates and dimension in two-dimensional image space, is reversed.

That is, the first 2D to 3D transformation sub-module 36 is configured to transform the adjusted or corrected object data 34*a*, which includes corrected or adjusted dimensions, to corrected object data 40*a*, which includes location and/or dimensions such as height and/or width and/or length, of the object in three-dimensional space. The corrected data 40*a* on object geometry is output to the tracking system 42 as feedback to update its information of an object of interest. The tracking system 42 may be part of the classification and segmentation module 1076 described above with respect to FIG. 3. The first 2D to 3D transformation sub-module 36 includes a processor and computer readable instructions for executing the dimension transformation process as well as directing receiving of two-dimensional object data 34*a* and outputting three-dimensional object data 34*a*.

The first 2D to 3D transformation sub-module 36 is not able to transform the adjusted bounding boxes 34*b* originating from the two dimensional data 14*a* since a reverse projection using three-dimensional data is not available. Instead, the object tracking system 10 includes a second 2D to 3D transformation sub-module 38 that operates on the adjusted object data 34*b* originating from two-dimensional imaging data 14*b*. The two-dimensional imaging data 14*b* does not include distance measurements unlike the three-dimensional imaging data 14*a*. As such, the second 2D to 3D transformation sub-module 38 is configured to derive distance data from the two-dimensional imaging data 14*b* using geometric analysis and based on height map data. The second 2D to 3D transformation sub-module 38 is configured to output three-dimensional object data 40*a*, which is constituted by three-dimensional bounding boxes 40*b* in embodiments. The second 2D to 3D transformation sub-module 38 includes a processor and software instructions operable by the processor to execute the required geometric analysis and to direct receipt of adjusted two-dimensional object data 34*b* and to direct output of adjusted three-dimensional object data 40*b*.

The second 2D to 3D transformation sub-module 38 is configured to receive the two-dimensional adjusted object data 34*b*, which is constituted by bounding boxes 34*b* in embodiments and to transform two-dimensional adjusted object data 34*b* to three-dimensional adjusted object data 40*b*, e.g. three-dimensional adjusted bounding boxes 40*b*. The second 2D to 3D transformation sub-module 38 is configured to estimate pose of the two-dimensional adjusted object data 34*b* using a trained neural network, which may be the same neural network as described above with reference to the visual classification sub-module 32, thereby determining three-dimensional dimensions for the three-dimensional bounding boxes 40*b*. The second 2D to 3D transformation sub-module 38 is further configured to estimate three-dimensional location based on height map data 52, which is discussed in further detail below, and height of the adjusted bounding boxes 34*b* in the two dimensional realm of two dimensional image 14*b*. That is, three-dimensional location of an object is determined based on the two dimensional image data 14*b* and the predetermined height map data 52 according to the systems and methods described further below, particularly with respect to FIG. 6. For distance, the 2D to 3D transformation module 38 is configured to implement geometric calculations using pre-mapped height map data 52. The height map data 52 allows a distance away from the vehicle to be estimated based on the two-dimensional adjusted bounding box 34*b*.

In more detail, the height map data 52 correlates height information to GPS or other position data. The height map data 52 may be stored on data storage device 1032. The GPS position data may be differential GPS positions data for enhanced accuracy. In this way, the height map data 52 is able to correlate a height of ground, particularly roads, for surveyed GPS or other location data points. Accordingly, a three-dimensional height map 52 is pre-built and is available for use by the system 10. The height map data 52 may be postprocessed from lidar data collected by mapping vehicles. The height map data 52 may include mapping tiles (for example of 10 cm by 10 cm) containing height of ground at the location of each tile, where each location can be GPS referenced.

In more detail, and in one example, the second 2D to 3D transformation sub-module 38 is configured to determine a location of at least one camera 12*c* that captured the two dimensional imaging data 12*c* relative to the height map data 52. That is, a position or pose of the camera 12*c* in the height map data 52 is determined. The pose of the camera 12*c* can be determined based on the pose of the vehicle 1010 in in the height map data 52 using GPS or other localization data of the vehicle, the corresponding GPS or other localization data in the height map data 52 and predetermined information concerning the size and relative position of the vehicle and the camera 12*c*, which can be determined from calibration data 22, for example.

The second 2D to 3D transformation sub-module 38 is configured to project at least part of the bounding boxes 34*b* at their respect locations in the two dimensional image data 14*b* into three dimensional image space of the height map data 52. The second 2D to 3D transformation sub-module 38 is configured to determine an intersection of the projection with the ground based on height map data 52. From the intersected height map data 52, e.g. tiles thereof, a three-dimensional location of the bounding boxes 34*b*, and thus the corresponding objects, is able to be estimated. In an exemplary embodiment, a vertical bottom of the bounding boxes 34*b* is projected to find the corresponding point in the height map data 52, thereby allowing approximate distance in three-dimensional space from the camera 12*c* to be determined. The projection performed by the second 2D to 3D transformation sub-module 38 may make use of a ray tracing algorithm. Further, in order to accurately project two dimensional data into the three-dimensional height map data, not only is the vehicle and camera pose used based on GPS or other localization data and predetermined dimensional information, but also calibration data 22 concerning intrinsic and extrinsic calibration of the camera 12*c*, which provides field of view information. Camera pose can be ascertained from predetermined camera pose data 54, which may be stored on data storage device 1032 and which may be incorporated in the calibration data 22. A projection algorithm, e.g. based on ray tracing, uses the camera pose data 54 and camera calibration data 22 to intersect the ray from the bounding boxes 34*b* in the camera image data 14*b* into the height map data 52. Based on this projection, the second 2D to 3D transformation sub-module 38 calculates a relative distance between the vehicle and detected objects represented by the bounding boxes 34*b*.

The second 2D to 3D transformation sub-module 38 is configured to combine three dimensional pose data for the bounding boxes 34*b* obtainable from the visual classification sub-module 32 and the estimated three-dimensional location data obtained as described above to produce three-dimensional adjusted bounding boxes 40*b*. The adjusted bounding boxes 40*b* in three dimensions have been obtained from two dimensional imaging data 14*b* in combination with predetermined three-dimensional height map data 52.

The second 2D to 3D transformation sub-module 38, and the algorithms operated thereby, exploit the fact that in the camera imaging data 14*b*, assuming a flat ground surface, bottoms of closer objects, or the bounding boxes 34*b* representing them, will be lower in the image and farther from the horizon line. However, this assumption is false when the ground isn't flat. The present disclosure, in one exemplary embodiment, makes use of the height map data 52 to compensate even for hilly terrains.

The tracking system 42, which may be part of the classification and segmentation module 1076, is configured to track objects around the vehicle 1010 in three-dimensions and in real time based on the adjusted bounding box data 40*a*, 40*b*. Adjusted object data 40*a* originating from three-dimensional imaging data 14*a* is taken into account, as is adjusted object data 40*b* originating from two-dimensional imaging data 14*b*. The tracking system 42 is configured to execute known tracking algorithms on the adjusted object data 40*a*, 40*b* through a processor and suitably configured computer readable instructions to determine upon control commands 44. The control commands 44 are operated through the autonomous driving system 1070 to assist in control of the vehicle 1010.

The exemplary embodiment of the object tracking system 10 of FIG. 4 is included in the autonomous driving system 1070. The autonomous driving system 1070 is configured to execute steering and speed control maneuvers, amongst other possible autonomous driving possibilities, to avoid collisions and to move cooperatively with tracked objects based in part on the control commands 44. The autonomous driving system 1070 operates known autonomous vehicle control computer instructions through a processor based in part on the control data 44, as described above with respect to FIG. 3.

FIG. 5 shows a flow chart describing exemplary method and system aspects of the present disclosure for tracking an object. The steps of the flow chart of FIG. 5 can be implemented by computer program instructions stored on a computer readable medium executed by a processor such as the at least one processor 1044. The steps may be carried out by the modules and sub-modules described with respect to FIG. 4 for example and may also take in further aspects of the autonomous driving system 1070 described with respect to FIG. 4.

The flow chart describes an exemplary method 60 of tracking an object. The method includes a step 62 of receiving three-dimensional imaging data and a step 64 of receiving two-dimensional imaging data. The three-dimensional imaging data 14*a* is captured by a Lidar device 12*a* and the two-dimensional imaging data 14*b* is captured by a visual camera 12*c* in exemplary embodiments. In embodiments, the two- and three-dimensional data images surroundings of the vehicle and may be 360° surround imaging. The data is received through data receiving module 16. The three-dimensional data 14*a* may crop dimensions of an object due to reflectivity issues, or an object may be partly or wholly missed by the three-dimensional data 14*a*. The methods and systems describe herein propose image processing techniques to complete or correct the three-dimensional data using the two dimensional imaging data 14*b*.

In embodiments, the method 60 includes a step 66, performed through the 3D object identification module 18*a*, of estimating a three dimensional geometry of an object based on the three dimensional imaging data 14*a*. In one embodiment, step 66 includes identifying and demarcating one or more objects in the three-dimensional imaging data 14*a*. Step 66 may involve filtering out background and segmentation image analysis processes to demarcate one or more objects. In an embodiment, step 66 determines and outputs a three-dimensional bounding box 20a for each identified object in the three-dimensional imaging data 14a. Each bounding box 20a includes three-dimensional location and three-dimensional dimensions object data.

Additionally or alternatively to step 66, the method 60 includes a step 68, performed through the 2D object identification module 18b, of estimating a two-dimensional geometry of an object based on the two-dimensional imaging data 14b. In one embodiment, step 68 includes identifying and demarcating one or more objects in the two-dimensional imaging data 14b. Step 66 may involve filtering out background and segmentation image analysis processes to demarcate one or more objects. In an embodiment, step 68 determines and outputs a two-dimensional bounding box 20b for each identified object in the two-dimensional imaging data 14b. Each bounding box 20b includes two-dimensional location and two-dimensional dimensions object data.

The method 60 includes a first adjusting step 70, performed through the registration and 3D to 2D transformation sub-modules 24, 26, of adjusting the estimated three-dimensional geometry of the one or more objects based on the two-dimensional imaging data 14b. That is, step 70 carries out image processing on the object data output from step 66 to adjust or correct the geometry of each identified and demarcated object based on geometry of the one or more objects in the two-dimensional imaging data 14b. In one embodiment, step 70 includes a sub-step 70a of projecting the three-dimensional bounding boxes 20a from step 66 into two-dimensional bounding boxes 30a registered in the two-dimensional imaging data. More specifically, intrinsic and extrinsic calibration data 22 is used to position and size one or more three-dimensional bounding boxes 20a from step 66 into two-dimensional image space. Accordingly, the projection sub-step 70a outputs one or more bounding boxes 30a including two-dimensional position data and two dimensional dimensions data positioned according to calibration data 22 allowing registration between the three-dimensional imaging data 14a and the two-dimensional imaging data 14b.

The first adjusting step 70 includes a sub-step 70b of performing bounding box regression through the visual classification sub-module 32. The bounding box regression is carried out on the one or more two-dimensional bounding boxes 30a. The two dimensional bounding boxes 30a are taken as a region proposal and run through a neural network along with the two-dimensional imaging data 14b. Based on the two dimensional imaging data 14b, the bounding box regression sub-step 70b is able to correct or adjust position and/or dimensions of the one or more bounding boxes 30a to output adjusted two-dimensional versions 34a thereof. The bounding box regressions sub-step uses the region proposal from the three-dimensional imaging data originating bounding boxes 30a, determines corresponding objects in the two dimensional imaging data originating bounding boxes 20b and refines the three-dimensional imaging data originating bounding boxes 30a based on more precise image data available from the original two dimensional data 20b, thereby producing adjusted bounding boxes 34a.

The first adjusting step 70 includes, in embodiments, a sub-step 70c of transforming the adjusted two-dimensional bounding boxes 34a into three-dimensional adjusted bounding boxes 40a. The transforming sub-step 70c reverses the projection step 70a based on calibration data 22 relating the two-dimensional image capture device 12c and the three-dimensional image capture device 12a and based on range data derivable from demarcated objects 20a in the three-dimensional imaging data 14a.

The first adjusting step 70 takes three-dimensional object data or bounding boxes 20a and corrects an aspect such as dimensions, number and/or position of the object based on the two-dimensional imaging data 12c. The first adjusting step 70 outputs corrected or adjusted three-dimensional object data or bounding boxes 34b. The first adjusting step 70 is able to divide, merge or change the size and/or position of the object data 20a from the estimating step 66.

Additionally or alternatively to the first adjusting step 70, the method 60 may further include a second adjusting step 72 that operates on the two-dimensional object data 20b obtained from estimating step 68 to determine adjusted three-dimensional object data 40b. In embodiments, the second adjusting step 72 includes a sub-step 72a of performing a bounding box regression. This sub-step replicates sub-step 70b described above. That is, estimated two-dimensional bounding boxes 20b, which include two-dimensional position and dimensions data, are run through visual classification sub-module 32 to carry out bounding box regression. The bounding box regression sub-step 72 uses a neural network and the two-dimensional imaging data 14b to refine position, number and/or size of the bounding boxes 20b to determine adjusted two-dimensional bounding boxes 34b.

The second adjusting step 72 includes, in embodiments, a sub-step 72b of transforming the adjusted two-dimensional object data 34b, which is constituted by one or more two-dimensional bounding boxes 34b, to three-dimensional object data or bounding boxes 40b. The sub-step 72b of performing three-dimensional transformation can not replicate the transforming step 70c described above as range data is not available for the two-dimensional imaging data 14b upon which steps 68 and 72 operate. Accordingly, transforming sub-step 72b makes use of height mapping data 52, as detailed below with respect to FIG. 6. That is, FIG. 6 details an exemplary method of transforming two dimensional bounding boxes 34b originating from two dimensional imaging data into three-dimensional imaging data according to one implementation of sub-step 72b.

In the exemplary 2D to 3D transforming method of FIG. 6, height map data 52 is received in step 62. The height map data 52 correlates position, e.g. GPS position, and ground height. The height map data 52 may be processed data obtained from a range finding imaging device such as a lidar device.

In step 82, camera pose is estimated relative to height map data 52. That is, predetermined pose data 54 concerning dimensions of the vehicle and the camera is retrieved and GPS or other localization data is obtained from the positioning system 1076 including GPS sensor 12d. This data is combined to determine to determine camera pose, e.g. position and dimensions, relative to the height map data.

In step 86, two dimensional object data 34b in the two dimensional imaging data 14b is projected, based on the camera pose from step 82, relative to the height map data 52. That is, ray tracing is performed from the camera 12c for the two dimensional object data 34b into the height map data 52. Calibration data 22 for the camera 12c is used to register the two dimensional imaging data 14b and the height map data 52. Just part of the two dimensional object data 34b may be taken, specifically a bottom of each bounding box 34b.

In step 88, a ground intersection of the projection or ray tracing from step 86 is determined.

In step 90, height map data 52 is used to estimate at least distance from the camera 12c and/or the vehicle based on the ground intersection from step 88 such that range data can be obtained for the object data 34*b*, optionally in addition to three dimensional location in the other two spatial dimensions. Three dimensional location data for the object data 34*b* is built from the range data and optional also other dimensions spatial information obtained from the ground intersection of step 88.

In step 92, three dimensional dimensions of the objects corresponding to the object data 34*b* are received from the visual classification sub-module 32 as has been described heretofore. These dimensions from the visual classification sub-module are derived from a neural network classification process on the two-dimensional object data 20*b*.

In step 94, three dimensional location and dimensions are output from the second adjusting step 72 for use in subsequent steps.

In the method of FIG. 6, the object data may be bounding boxes derived as described further herein.

Accordingly, the method of FIG. 5 allows position of an object represented by object data 34*b* to be derived based on vehicle location, as determined through GPS sensor 12*d* and other parts of localization system 1076, and bearing (projection) from a camera image 14*b* of an identified object 34*b*. Geometry of the height map data 52 is used to find a three dimensional location of the object represented by the object data 34*b*. Specifically, an imaginary line is drawn from the camera 12*d* (representing the bearing of the identified object 34*b* from the image 14*b*) to find where that imaginary line intersects with the height map data 52. The intersection point can be correlated to three dimensional location of the identified object 34*b* using information in the height map data 52.

The second adjusting step 72 is able to determine three-dimensional object data 40*b*, generally constituted by one or more bounding boxes, based on two dimensional imaging data 14*b* when three-dimensional imaging data 14*a* is not available or incomplete. The second adjusting step 72 is generally run in parallel to the combined operations on the three-dimensional and two-dimensional imaging data 14*a*, 14*b* as described with respect to steps 66 and 70 or alternatively thereto. The operations on the two dimensional imaging data described by steps 68 and 72 may be particularly useful for object tracking for distance at which Lidar beams from Lidar device 12*a* are so divergent as to create a possibility of missing an object.

The method 60 further includes a step 70 of tracking an object using the adjusted three-dimensional geometry of an object. That is, the first adjusting step 70 outputs object data 40*a* representing geometry of an object in three-dimensions, where the object data 40*a* is generally constituted by a three-dimensional bounding box 40*a*. Further, the second adjusting step 72 output object data 40*b* represent geometry of another object in three-dimensions, where the object data 40*b* is generally constituted by a three-dimensional bounding box 40*b*. One or both of the objects are tracked in real space based on past three-dimensional object data and the present three-dimensional object data 40*a*, 40*b*. Various parameters can be derived from the tracking including speed and acceleration of the tracked one or more objects. Based on parameters derived from the tracking step 74, control data 44 can be produced for performing a control function of an automated machine such as an autonomous vehicle 1010 through the autonomous driving system 1200.

The method 60 includes the step 76 of controlling the automated machine, which is an autonomous vehicle 1010 in the exemplary embodiments. For example, movement of the machine 1010 is controlled based on the control data 44. That is, steering and speed control may be implemented based on the control data 44. In particular, autonomous vehicle control is performed through autonomous driving system 1070 and based partly on control data 44.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration of the invention in any way. Rather, the foregoing detailed description will provide those skilled in the art with a convenient road map for implementing an exemplary aspect of the invention. It being understood that various changes may be made in the function and arrangement of elements described in an exemplary aspect without departing from the scope of the invention as set forth in the appended claims.

What is claimed is:

1. An object tracking system for a vehicle having one or more vehicle control components, comprising:
   a vehicle control module in communication with the one or more control components, the vehicle control module including:
   a non-transitory computer readable medium comprising:
   a data storage module configured to, by a processor, store in a data storage device height map data correlating ground height and location and generated from lidar data;
   a data receiving module configured to, by a processor, receive two dimensional imaging data generated by a camera and including at least one object;
   a two dimensions to three dimensions transformation module configured to, by a processor, determine a location of the camera in the height map data based on a real world location of the camera, project the at least one object of the two dimensional imaging data into the height map data based on the location and ray tracing to determine a distance of the object from the camera, and determine a location of the at least one object in a three dimensional space based on the distance;
   a tracking module configured to, by a processor, track at least one object using the location of the at least one object in the three dimensional space and generate tracking data based thereon; and
   the vehicle control module being configured to actuate at least one of the one or more control components based, in part, on the tracking data.

2. The object tracking system of claim 1, wherein the two dimensions to three dimensions transformation module is further configured to project the at least one object of the two dimensional imaging data into the height map data to determine a ground intersection of the at least one object and, based on the ground intersection and the correlation of ground height and location in the height map data to determine the distance of the object from the camera.

3. The object tracking system of claim 1, wherein the data storage module is configured to store calibration data including camera pose data, and wherein the two dimensions to three dimensions transformation module is configured to project the at least one object of the two dimensional imaging data into the height map data from the camera pose.

4. The object tracking system of claim 1, comprising an object identification module configured to demarcate the at least one object in the two dimensional imaging data to obtain two dimensional object data, and wherein the two dimensions to three dimensions transformation module is configured to determine the location of the at least one object in the three dimensional space based on the two dimensional object data.

5. The object tracking system of claim 4, wherein the object identification module is configured to determine at least one bounding box as the two dimensional object data.

6. The object tracking system of claim 4, wherein the two dimensions to three dimensions transformation module is configured to transform a bottom of the at least one bounding box to a ground intersection in the height map data in determining the location of the at least one object in three dimensional space.

7. The object tracking system of claim 1, comprising a visual classification module configured to run a neural network to classify the at least one object and to determine dimensions of the at least one object based on the classification, wherein the tracking module is configured to track at least one object using the location of the at least one object and the dimensions of the at least one object.

8. The object tracking system of claim 7, comprising an object identification module configured to demarcate the at least one object to obtain at least one bounding box, wherein the visual classification module is configured to perform bounding box regression on the at least one bounding box using the neural network to obtain at least one regressed bounding box, and wherein the two dimensions to three dimensions transformation module is configured to determine the location of the at least one object in three dimensional space based on the two dimensional imaging data, the height map data and the at least one regressed bounding box.

9. The object tracking system of claim 1, wherein the data receiving module is configured to receive three dimensional imaging data including at least one other object, wherein the tracking module is configured to track the at least one object based on the two dimensional imaging data and the at least one other object based on the three dimensional imaging data.

10. An autonomous vehicle, comprising:
a sensor system comprising at least one camera that generates two dimensional imaging data including at least one object;
a data storage device configured to store height map data correlating ground height and location;
a processor configured to:
determine a location of the at least one camera in the height map data based on a real world location of the autonomous vehicle and a pose of the at least one camera,
project the at least one object of the two dimensional imaging data into the height map data based on the location and ray tracing to determine a distance of the object from the camera,
determine a location of the at least one object in a three dimensional space based on the distance;
track at least one object using the location of the at least one object and to responsively output tracking data; and
an autonomous vehicle control module configured to control one or more vehicle components based, in part, on the tracking data.

11. The autonomous vehicle of claim 10, wherein the processor is configured to transform a height of the at least one object in the two dimensional imaging data to a ground intersection in the height map data and determine the distance based on the ground intersection.

12. The autonomous vehicle of claim 10, wherein the processor is configured to demarcate the at least one object to obtain at least one bounding box and to perform bounding box regression on the at least one bounding box using a neural network to obtain at least one regressed bounding box, and wherein processor is configured to determine the location of the at least one object in the three dimensional space based on the at least one regressed bounding box.

13. The autonomous vehicle of claim 12, wherein the processor is configured to transform a bottom of the at least one bounding box to a ground intersection in the height map data in determining the location of the at least one object in three dimensional space.

14. A method of tracking at least one object, comprising:
storing, via a processor, height map data correlating ground height and real world location;
receiving, via a processor, two dimensional imaging data including at least one object;
determining, via a processor, a location of the camera in the height map data based on a real world location of the camera;
projecting, via a processor, the at least one object of the two dimensional imaging data into the height map data based on the location and ray tracing to determine a distance of the object from the camera;
determining, via a processor, a location of the at least one object in a three dimensional space based on the distance;
tracking, via a processor, at least one object using the location of the at least one object for use in autonomous vehicle control; and
exercising vehicle control based, in part, on the tracking.

15. The method of claim 14, comprising receiving, via a processor, calibration data including camera pose data spatially relating the autonomous vehicle and the at least one camera, determining, via a processor, a camera pose in the height map data based on the location of the vehicle and the camera pose data and ray tracing the at least one object of the two dimensional imaging data into the height map data from the camera pose in the height map data in determining a location of the at least one object in three dimensional space.

16. The method of claim 14, comprising determining, via a processor, a ground intersection in the height map data based on the at least one object in the two dimensional imaging data in determining location of the at least one object in three dimensional space.

* * * * *